United States Patent
Gillespie et al.

(10) Patent No.: US 9,775,464 B2
(45) Date of Patent: Oct. 3, 2017

(54) GRILL ROTISSERIE

(71) Applicant: W.C. BRADLEY CO., Columbus, GA (US)

(72) Inventors: Brad Gillespie, Midland, GA (US); Mark Edward Davis, Columbus, GA (US); Christopher J. Bennett, Opelika, AL (US); John R. Allen, Cataula, GA (US)

(73) Assignee: W.C. Bradley Co., Columbus, GA (US)

( * ) Notice: Subject to any disclaimer, the term of this patent is extended or adjusted under 35 U.S.C. 154(b) by 756 days.

(21) Appl. No.: 14/168,367

(22) Filed: Jan. 30, 2014

(65) Prior Publication Data

US 2014/0208960 A1   Jul. 31, 2014

Related U.S. Application Data

(60) Provisional application No. 61/758,494, filed on Jan. 30, 2013.

(51) Int. Cl.
*A47J 37/04*   (2006.01)
*A47J 37/07*   (2006.01)

(52) U.S. Cl.
CPC ........... *A47J 37/041* (2013.01); *A47J 37/042* (2013.01); *A47J 37/075* (2013.01)

(58) Field of Classification Search
CPC ....... A47J 37/041; A47J 37/042; A47J 37/075
USPC ............. 99/421 H, 421 R, 421 HV, 340, 341
See application file for complete search history.

(56) References Cited

U.S. PATENT DOCUMENTS

| | | |
|---|---|---|
| 3,081,694 A | 3/1963 | Lipsey |
| 3,129,653 A * | 4/1964 | Kertesz ................. A47J 37/041 99/421 M |
| 4,152,974 A | 5/1979 | Tienor |
| 4,572,062 A | 2/1986 | Widdowson |
| 4,810,856 A * | 3/1989 | Jovanovic ............... A47J 27/04 126/20 |
| 4,867,051 A * | 9/1989 | Schalk ................ A47J 37/0713 198/797 |
| 4,892,032 A | 1/1990 | Jerome |
| 4,924,766 A | 5/1990 | Hitch |
| 5,224,676 A | 7/1993 | Johnston |

(Continued)

FOREIGN PATENT DOCUMENTS

| | | |
|---|---|---|
| CN | 2113017 | 8/1992 |
| CN | 201481146 | 5/2010 |

(Continued)

OTHER PUBLICATIONS

PCTUS201413876, May 21, 2014, W.C. Bradley Co.
14746625.4, Sep. 1, 2016, W.C Bradley Co.
201480006132.3, Oct. 9, 2016, W.C. Bradley Co.

*Primary Examiner* — Omar Flores Sanchez

(74) *Attorney, Agent, or Firm* — David G. Woodral; Gable Gotwals

(57) ABSTRACT

A rotisserie having a first support structure with a rotisserie motor affixed thereto, the rotisserie motor having a receptacle for receiving a spit rod. A second support structure defines a slot for receiving the spit rod. The first and second support structures are mounted to side shelves on a grill on opposite sides of a cooking grate. The side shelves each define at least one mounting aperture for retaining the support structures in upright positions.

18 Claims, 4 Drawing Sheets

(56) References Cited

U.S. PATENT DOCUMENTS

| | | | |
|---|---|---|---|
| 5,649,475 A * | 7/1997 | Murphy | A47J 37/0745 |
| | | | 126/25 R |
| 7,383,835 B2 | 6/2008 | Liu | |
| 8,051,768 B2 | 11/2011 | Stephen et al. | |
| 9,247,849 B1 * | 2/2016 | Howes | A47J 37/041 |
| 2004/0216617 A1 | 11/2004 | Hsu | |
| 2006/0112837 A1 * | 6/2006 | Gabrielle | A47J 37/042 |
| | | | 99/419 |
| 2009/0025573 A1 | 1/2009 | Thompson | |
| 2009/0151575 A1 | 6/2009 | Eisendrath | |
| 2012/0288596 A1 | 11/2012 | Baggott | |

FOREIGN PATENT DOCUMENTS

| | | |
|---|---|---|
| CN | 20112472606 | 7/2012 |
| WO | 2006083705 A2 | 8/2006 |

\* cited by examiner

9,775,464 B2

GRILL ROTISSERIE

CROSS-REFERENCE TO RELATED CASES

This application claims the benefit of U.S. provisional patent application Ser. No. 61/758,494, filed on Jan. 30, 2013, and incorporates such provisional application by reference into this disclosure as if fully set out at this point.

FIELD OF THE INVENTION

The present invention relates generally to the field of cooking grills in general and, more specifically, to rotisseries for cooking grills.

BACKGROUND OF THE INVENTION

Barbecue grills, especially those fueled by natural or liquefied petroleum gas, are often equipped with an optional rotisserie kit for cooking a large piece of meat over the main cooking grate. This kit typically consists of an electric motor, a long spit rod, some method of locating meat on the spit rod, and some mounting brackets. The mounting brackets may consist of more or less flat plates attached by nuts and bolts to the upwardly extending sides of the firebox. The main cooking grate is, of course, also mounted inside the firebox.

Various ways exist of fitting and clamping the mounting brackets to the sides of the firebox. These include plates clamped to the firebox side, and the side shelf, with nuts and bolts. Wire form brackets may also clamped to the firebox side with nuts and bolts. In other cases, the motor mounting is replaced by a pivoting bracket that is otherwise flush with the surface of the side shelf that extends outwardly from the side of the firebox.

Nuts and bolts may be subject to corrosion, which may make their removal difficult. Thermal cycling may result in loosening of the bolted connection. In addition, flat plate mounting brackets must be specifically configured to interface correctly with the grill lid, which is hinged to the firebox and covers the main cooking grate. The alternate method described above avoids these issues, if only on the motor end of the rotisserie attachment, but at the expense of added cost and complexity and encroachment on the side shelf flat area when the rotisserie is in use.

What is needed is a system and method for addressing the above, and related, issues.

SUMMARY OF THE INVENTION

The invention of the present disclosure, in one aspect thereof, comprises a rotisserie having a first support structure with a rotisserie motor affixed thereto, the rotisserie motor having a receptacle for receiving a spit rod. A second support structure defines a slot for receiving the spit rod. The first and second support structures are mounted to side shelves on a grill on opposite sides of a cooking grate. The side shelves each define at least one mounting aperture for retaining the support structures in upright positions.

In some embodiments, the first support structure comprises a pair of upright supports joined by an arch. The pair of upright supports may each have a stopper that limits their insertion depth into a pair of mounting apertures in the respective side shelf. The first support structure may further comprise a mounting plate between the pair of upright supports, the mounting plate affixing the rotisserie motor to the support structure. The arch may provide a flat segment for bearing the weight of a grill lid.

In some embodiments, the second support structure comprises a first upright support and a second interrupted upright support, an arch connecting the first and second upright supports, a mounting plate defining a slot through the second interrupted upright support and joining the first and second upright supports, and a pair of rollers in the slot for receiving a spit rod. The arch may provide a flat segment for bearing the weight of a grill lid.

The rotisserie may include a removable spit rod having a collar for riding in the slot that is adjustable along a length of the spit rod. The spit rod may have at least one fork that is adjustable along the length of the spit rod for aiding in retaining food on the spit rod.

The invention of the present disclosure, in another aspect thereof, comprises a rotisserie with a first support structure having a first pair of generally vertical support members joined at the tops thereof by an arch segment. The rotisserie has a second support structure having a second pair of generally vertical support members joined at the tops thereof by an arch segment. First and second side shelves are on opposite sides of a cooking grate, the first and second side shelves defining at least one first and second pair of mounting apertures that receiving the respective first and second pair of vertical support members. A spit rod is suspended between the first and second support structures over the cooking grate at a predetermined height.

The first and second pair of generally vertical support members may each have a stop located thereon that prevents the respective support structures from sinking into the respective apertures beyond a predetermined depth that corresponds with the predetermined height of the spit rod. The stops may be adjustable to allow adjustment of the height of the spit rod over the cooking grate. In some embodiments, the first and second shelves define a plurality of pairs of mounting apertures, including at least one pair on each of the first and second shelves that are countersunk to allow for deeper insertion of the respective support members and a lower mounting height for the rotisserie spit rod.

The first and second support structures may each define a flat portion in the arch segment for bearing the weight of a grill lid. The first support structure may have a mounting plate fitted between the vertical support members that mounts a rotisserie motor. The second support structure may have a mounting plate affixed to the support members that defines a slot passing through an interruption in one of the support members, the slot having a pair or rollers mounted thereto for receiving the spit rod.

The invention of the present disclosure, in another aspect thereof, comprises a rotisserie having a pair of opposing support structures on opposite sides of a cooking grate, the support structures each comprising a pair of vertical support members that insert into apertures in respective side shelves of a grill on either side of the cooking grate. A motor is mounted to one of the pair of opposing support structures for turning a spit rod. A slot is defined into the other of the pair of opposing support structures for receiving and supporting the spit rod. Each of the vertical support members has stops that determine a depth of insertion in the respective apertures in the side shelves for determining a height of the spit rod over the cooking grate. Each of the opposing support structures may provide a flat segment for supporting the weight of a grill lid over the spit rod when the rotisserie is operational.

DETAILED DESCRIPTION OF THE PREFERRED EMBODIMENTS

Figure 1:
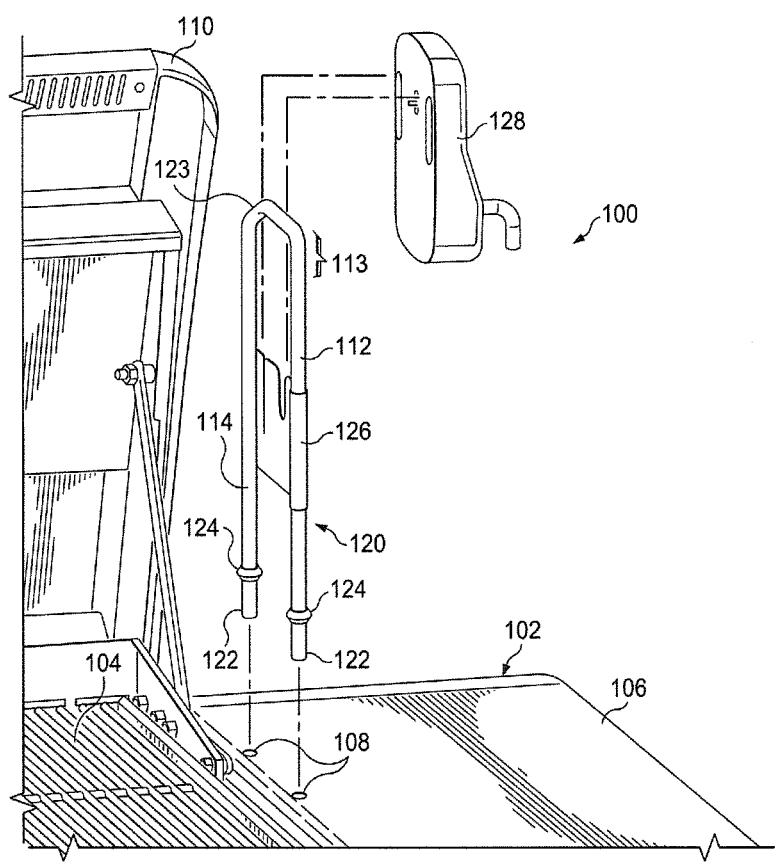
FIG. 1 is an exploded perspective view of a portion of a grill rotisserie according to aspects of the present disclosure.

Referring now to FIG. 1, a perspective view of a right hand portion of a grill rotisserie 100 is shown. The grill rotisserie 100 is designed to removably affix to a cooking grill 102. The cooking grill 102 may be a gas grill, a charcoal grill, an electric grill, or provide a combination of power options. The grill 102 may provide a grate 104 upon which food may be placed for cooking. A firebox (not shown) below the grate 104 may be relied upon where the grill utilizes gas or solid fuel. The grill 102 may provide a lid 110 for selectively covering the cooking grate 104.

In the present embodiment, the grill 102 provides a side shelf 106. The side shelf 106 provides one or more pairs of mounting holes 108. The mounting holes 108 may be punched, drilled, or cast into the side shelf 106 depending upon the materials comprising the side shelf 106. The mounting holes 108 may be spaced appropriately to retain and stabilize the grill rotisserie 100 as described herein.

In the present embodiment, the rotisserie 100 comprises a pair of upright supports 112, 114 joined by an arch 113 to create support structure 120. In the present embodiment the support structure 120 is shown on the right hand side of the grill 102, but could easily be adapted for use on the left hand side instead. For purposes of the present disclosure, the term "arch" does not necessarily mean a perfect parabolic or circular arch, so long as the shape provides for connecting the supports in a generally upright or vertical fashion (that is, parallel to one another). The material comprising the support structure 120 may be steel or another alloy, or another suitable heat-resistant material. The upright supports 112, 114 of support arch have ends 122 that insert into mounting holes 108. In some embodiments, multiple pairs of mounting holes 108 may be provided to allow for variation of the position of the support structure 120 relative to the lid 110 and/or cooking grate 104.

The ends 122 may be provided with flares or stops 124 that are wider than the mounting holes 108 and are placed somewhat distally from the very tips of ends 122 of the upright supports 112, 114. This allows the ends 122 to fit into the mounting holes 108 but prevents the support structure 120 from sinking excessively into the mounting holes 108 even under load. In some embodiments, the stops 124 may be implemented as nuts (and the ends 122 threaded) or other adjustable mechanisms to allow for adjustment of the height of the rotisserie 100. In further embodiments, various pairs of mounting holes 108 may be countersunk to allow for selection of height.

In some embodiments the size and weight of the rotisserie 100 with the ends 122 in the mounting holes 108 provides all necessary securement for the rotisserie 100 relative to the grill 102. However, in other embodiments the ends 122 may be threaded to accept a nut (not shown) on the opposite side of the side shelf 106. Other additional securement fasteners (e.g., pins or friction devices) could also be used in this application. In further embodiments the fit between the ends 122 and the mounting holes 108 may be such that a degree of force is required to remove the support structure 120 ensuring that it will not be inadvertently knocked out or removed.

A number of bends may be provided in the arch 113 so as to allow the upright supports 112, 114 to be substantially vertical. In some embodiments, a tangent portion or flat 123 may be provided near the junction of the arch 113 and the upright support 114. This allows the lid 110 to rest against the support structure 120. The flat 123 promotes even distribution of the weight of the lid 110, which may otherwise tend to have a toppling effect, into both upright supports 112, 114.

The support structure 120 may be provided with a mounting plate 126 that may span between the upright supports 112, 114. The mounting plate 126 may comprise sheet metal or another suitably resilient material that may be affixed to the support structure 120. The mounting plate 126 may be used for securing a rotisserie motor 128. The rotisserie motor 128 may be an electrically powered rotisserie motor 128 capable of providing adequate rotational torque for the size of the rotisserie 100 load that will be mounted on it (e.g., food item). The motor 128 has a receptacle of the appropriate internal contour and size to removably receive and rotate a spit rod.

Figure 2:
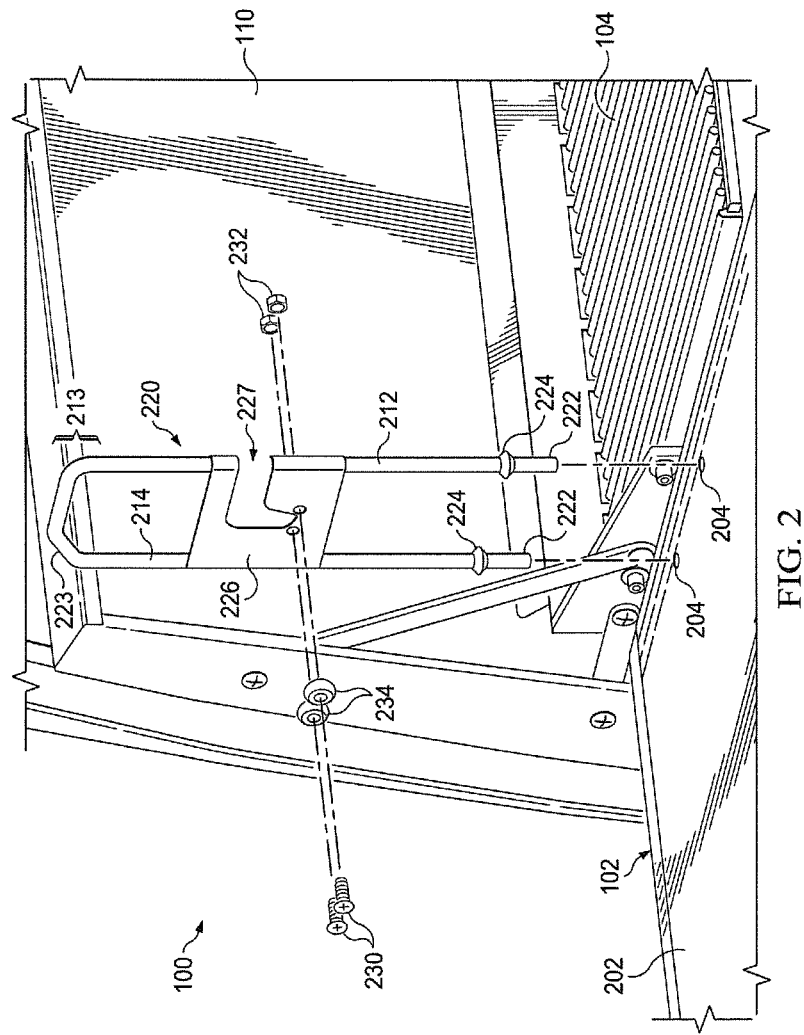
FIG. 2 is an exploded perspective view of another portion of the grill rotisserie of FIG. 1.

Referring now to FIG. 2, a perspective view of a left portion of the grill rotisserie 100 is shown. The grill rotisserie 100 comprises a second support structure 220, shown here on the left side of the cooking grate 104 (though it could be configured for mounting on the right side as well). The support structure 220 comprises upright supports 212, 214 joined by the arch 213. A mounting plate 226 joins the upright supports 212, 214. The mounting plate 226 may comprise sheet metal or another suitably resilient material that may be affixed to the support structure 220.

The upright support 212 is interrupted by a slot 227 defined in mounting plate 226. The slot 227 is configured to retain one end of a rotisserie spit and the bottom of the slot 227 which is provided with a pair of bolts 230 and nuts 232 which affix a set of rollers 234.

Ends 222 of the respective upright supports 212, 214 may be provided with flares or stops 224. The ends 222 fit into one or more pairs of mounting holes 204 defined in a left side shelf 202. As with the support structure 120 on the opposite side of the cooking grate 104, the support structure 220 may be inserted into the corresponding mounting holes 204 and prevented from being too deeply located by the stops 224. In some embodiments, the stops 124 may be implemented as nuts (and the ends 122 threaded) or other adjustable mechanisms to allow for adjustment of the height of the rotisserie 100. In further embodiments, various pairs of mounting holes 204 may be countersunk to allow for selection of height.

In some embodiments the ends 222 may be threaded to accept nuts (not shown) below the side shelf 202 but in other embodiments other fasteners might be used (e.g., pins). However, some embodiments will simply be secured by a friction fit or by the weight of the rotisserie 100 itself.

A flat 223 may be defined in the arch 213 enabling the lid 110 to rest against the rotisserie 100 during operation. As with the opposite side, the flat 223 promotes even stability and even distribution of the weight of the lid 110 to both upright supports 212, 214. As the upright support 212 is of an interrupted design, the mounting plate 227 will also promote stability of the support structure 220.

Figure 3:
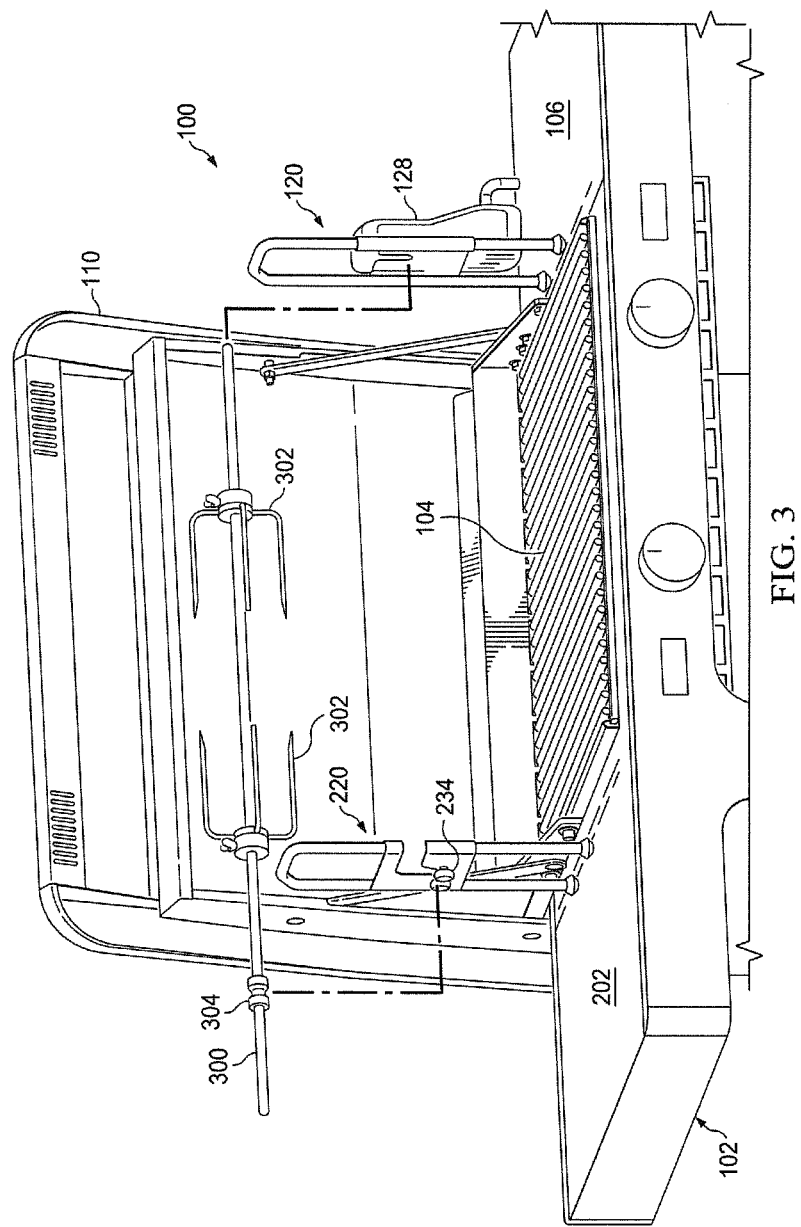
FIG. 3 is an exploded view of a spit being installed on the grill rotisserie of FIGS. 1 and 2.

Referring now to FIG. 3, a perspective view of both the left and right portions of the rotisserie 100 with a spit rod is shown. In the present embodiment the spit rod 300 is provided with a pair of opposing forks 302. In the present embodiment the forks 302 may be adjusted along the length of the spit rod 302 in order to accommodate and secure meat or other food items of various shapes and sizes. In one embodiment, the food item may be driven onto the spit rod 300 and the forks 302 may be attached into the food item from opposite ends to provide additional securement.

One end of the spit rod 300 will be affixed or inserted into the motor 128. This will allow the rotational force of the motor to be transmitted to the spit rod 300, and to the food item via the spit rod 300 and/or the forks 302. The end of the spit rod 300 that is not inserted into the motor 128 may be fitted with a collar 304. The location of the collar 304 may be adjustable along the length of the spit rod 300 to enable a single grill rotisserie 100 to be usable with cooking grills of various sizes and configurations. The collar 304 also provides a surface for interfacing with the rollers 324 on the support structure 220. With a groove in the collar 304 interfitting with the rollers 324, the opposite end of the spit rod 300 will be held in place in the receptacle of the motor 128. In the present embodiment, the support structure 220 merely provides a low resistance mounting point for the end of the spit rod 300 that is not affixed to the motor 128.

Figure 4:
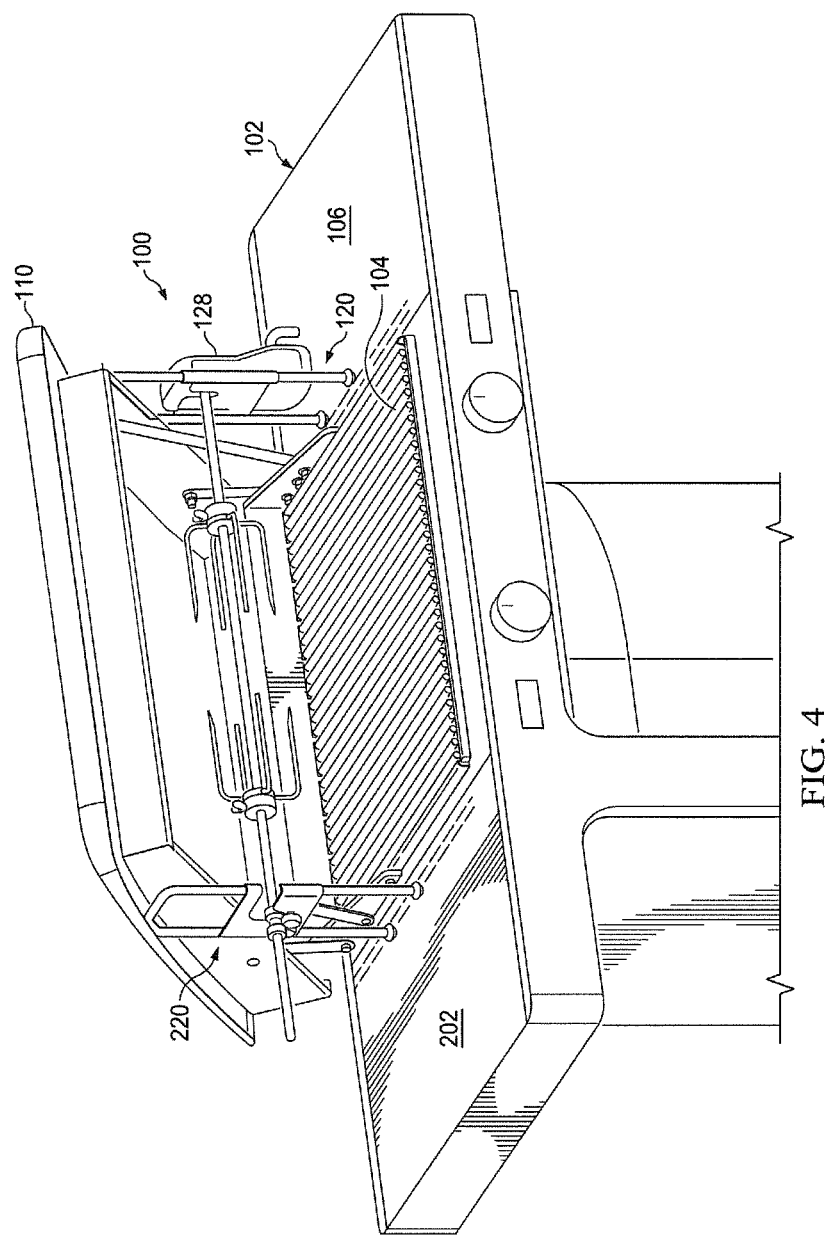
FIG. 4 is a perspective view of the grill rotisserie of FIGS. 1-3 fully installed on a grill.

Referring now to FIG. 4, a perspective view of the fully assembled grill rotisserie 100 is shown. No food product is shown for purposes of clarity. Here it can be seen how the spit rod 300 becomes affixed to the motor 128 and is freely rotatable within the left support 220. The lid 110 is shown resting against the respective supports 120, 220 on the flats 123, 223. In this manner there is no need for a separate device or mechanism for holding the lid 110 open. Furthermore having the lid 110 partially closed may serve to reduce the effects of wind and promote more even cooking of the food product on the rotisserie 100.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the invention as defined by the claims.

What is claimed is:

1. A rotisserie comprising:
   a first support structure with a rotisserie motor affixed thereto, the rotisserie motor having a receptacle for receiving a spit rod; and
   a second support structure defining a slot for receiving the spit rod;
   wherein the first and second support structures are mounted to horizontal side shelves on a grill on opposite sides of a cooking grate;
   wherein the side shelves each define at least one mounting aperture for retaining the support structures in upright positions; and
   wherein the side shelves do not form a part of any firebox below the cooking grate.

2. The rotisserie of claim 1, wherein the first support structure comprises a pair of upright supports joined by an arch.

3. The rotisserie of claim 2, wherein the pair of upright supports each have a stopper that limits their insertion depth into a pair of mounting apertures in the respective side shelf.

4. The rotisserie of claim 2, wherein the first support structure comprises a mounting plate between the pair of upright supports, the mounting plate affixing the rotisserie motor to the support structure.

5. The rotisserie of claim 2, wherein the arch provides a flat segment for bearing the weight of a grill lid.

6. The rotisserie of claim 1, wherein the second support structure comprises:
   a first upright support and a second interrupted upright support;
   an arch connecting the first and second upright supports;
   a mounting plate defining a slot through the second interrupted upright support and joining the first and second upright supports; and
   a pair of rollers in the slot for receiving a spit rod.

7. The rotisserie of claim 6, wherein the arch provides a flat segment for bearing the weight of a grill lid.

8. The rotisserie of claim 1, further comprising a removable spit rod having a collar for riding in the slot that is adjustable along a length of the spit rod.

9. The rotisserie of claim 7, further comprising at least one fork that is adjustable along the length of the spit rod for aiding in retaining food on the spit rod.

10. A rotisserie comprising:
    a first support structure having a first pair of generally vertical support members joined at the tops thereof by an arch segment;
    a second support structure having a second pair of generally vertical support members joined at the tops thereof by an arch segment;
    first and second horizontal side shelves on opposite sides of a cooking grate, the first and second horizontal side shelves defining at least one first and second pair of mounting apertures that receiving the respective first and second pair of vertical support members; and
    a spit rod suspended between the first and second support structures over the cooking grate at a predetermined height;
    wherein the horizontal side shelves do not form a part of any firebox below the cooking grate.

11. The rotisserie of claim 10, wherein the first and second pair of generally vertical support members each have a stop located thereon that prevents the respective support structures from sinking into the respective apertures beyond a predetermined depth that corresponds with the predetermined height of the spit rod.

12. The rotisserie of claim 11, wherein the stops are adjustable to allow adjustment of the height of the spit rod over the cooking grate.

13. The rotisserie of claim 10, wherein the first and second shelves define a plurality of pairs of mounting apertures, including at least one pair on each of the first and second shelves that are countersunk to allow for deeper insertion of the respective support members and a lower mounting height for the rotisserie spit rod.

14. The rotisserie of claim 10, wherein the first and second support structures define a flat portion in the arch segment for bearing the weight of a grill lid.

15. The rotisserie of claim 10, wherein the first support structure has a mounting plate fitted between the vertical support members that mounts a rotisserie motor.

16. The rotisserie of claim 10, wherein the second support structure has a mounting plate affixed to the support members that defines a slot passing through an interruption in one of the support members, the slot having a pair or rollers mounted thereto for receiving the spit rod.

17. A rotisserie comprising:
    a pair of opposing support structures on opposite sides of a cooking grate, the support structures each comprising a pair of vertical support members that insert into apertures in respective side shelves of a grill on either side of the cooking grate that do not form a part of a firebox below the cooking grate;

a motor mounted to one of the pair of opposing support structures for turning a spit rod; and a slot defined into the other of the pair of opposing support structures for receiving and supporting the spit rod;

wherein each of the vertical support members have stops that determine a depth of insertion in the respective apertures in the side shelves for determining a height of the spit rod over the cooking grate.

18. The rotisserie of claim 17, wherein each of the opposing support structures provide a flat segment for supporting the weight of a grill lid over the spit rod when the rotisserie is operational.

* * * * *